United States Patent [19]

Uretsky

[11] Patent Number: 4,513,622

[45] Date of Patent: Apr. 30, 1985

[54] METHOD OF FORMING RANDOM VIBRATION SPECTRUM AND DEVICE THEREFOR

[75] Inventor: Yan S. Uretsky, Kazan, U.S.S.R.

[73] Assignee: Kazansky Aviatsionny Institut Imeni A. N. Tupoleva, U.S.S.R.

[21] Appl. No.: 525,310

[22] Filed: Aug. 22, 1983

[51] Int. Cl.³ .............................................. G01M 7/00
[52] U.S. Cl. ...................................................... 73/664
[58] Field of Search ............................ 73/664; 364/508

[56] References Cited

U.S. PATENT DOCUMENTS 3,157,045 11/1964 Maki ...................................... 73/664
3,710,082 1/1973 Sloane et al. .......................... 73/664

FOREIGN PATENT DOCUMENTS 862018 9/1981 U.S.S.R. .

OTHER PUBLICATIONS

"Equipment for Reproducing and Reporting Random Vibrations and Shocks", Y. V. Veselov, et al., Leningradsky Dom Nauchno—Technicheskoy Propagandy, 1979.
"Sound and Vibration Analysis and Data Processing Devices", Bruel and Kjaer Model 7502, 7504, 6401 (1973).

Primary Examiner—Howard A. Birmiel
Assistant Examiner—John E. Chapman, Jr.
Attorney, Agent, or Firm—Steinberg & Raskin

[57] ABSTRACT

A method of forming a desired vibration spectrum comprising the steps of preliminarily causing vibration of an article in a predetermined frequency range by the use of harmonic variable-frequency oscillations and using a multichannel signal shaper to produce specific values of spectral vibration acceleration density at each chosen check point on the article under test in each band of the predetermined frequency range, a random output signal level K in each channel being computed by solving a set of linear equations. A device for accomplishing the proposed method comprises the multichannel shaper connected to a vibrator mounting the article under test; vibration pick-ups secured at the chosen check points and connected through a switch to the input of a signal analyzer; a unit for setting parameters of a desired random vibration spectrum; and a control unit. The device forming the subject of the invention also comprises a variable-frequency harmonic oscillator and a memory unit connected thereto.

3 Claims, 2 Drawing Figures

METHOD OF FORMING RANDOM VIBRATION SPECTRUM AND DEVICE THEREFOR

FIELD OF THE INVENTION

The present invention relates to strength tests and in particular to vibration tests of articles. More specifically, it concerns methods and devices for forming a random vibration spectrum. It may be used to best advantage in laboratory tests of complex articles having flexible structure and limited dimensions, which are installed on moving objects and subjected to random vibration in operation, for example, in aviation and rocket fields, machine building, automobile industries and the like.

BACKGROUND ART

There is known a method of forming a random vibration spectrum (cf. USSR Inventor's Certificate No. 862,018, Cl. G 01 M 7/00) wherein narrow-band filters are utilized to successively produce vibrations of an article by the use of uncorrelated narrow-band random signals in each band of a predetermined frequency range. The frequency bands of one group are designated with even numbers, the frequency bands of the other group being designated with odd numbers. A random vibration spectrum is assigned to suit a particular article under test as certain values of spectral vibration acceleration density in the specified frequency bands. The "vibrator-article" system is created after the article to be tested is secured on a vibrating table. At the initial stage said system is fed with random signals of the first group, and the level of random signals of said group is adjusted to conform to the present values of spectral vibration acceleration density, the subsequent step being computation of correction factors $C_n$ from the expression $$C_n^2 = \frac{q_n \int_{\Delta\Omega} \phi_n^2(\omega)d\omega}{\psi_f^2(\omega_n) \int_{\Delta\Omega} \phi_n^4(\omega)d\omega},$$

where $q_n$ is the preset value of spectral vibration acceleration density in the nth frequency band relating to the first group of the frequency bands;

$\phi_n(\omega)$ is the amplitude-frequency response of the nth narrow-band filter in the nth frequency band;

$\psi_f(\omega_n)$ is the amplitude-frequency response of the "vibrator-article" system at the midband frequency in the nth frequency band; and $\Delta\Omega$ is the predetermined frequency range.

Next the levels of the transmitted random signals are corrected by multiplying their values obtained after the adjustment at the first stage by the computed correction factors $C_n$. The corrected random signals are stored in the memory unit. The above operations are then performed on random signals of the second group of frequency bands. Thereafter the random signals in all bands of the predetermined frequency range are simultaneously read off from the memory unit and applied to the "vibrator-article" system.

There is also known a device for accomplishing the aforesaid method (cf. the cited USSR Inventor's Certificate) which comprises a white noise generator having its output connected to the input of a tuneable narrow-band filter which uses the white noise generator signal to successively furnish narrow-band random signals to a level adjuster whose input is connected to the output of the tuneable narrow-band filter. The output of the level adjuster is connected via the first contact of a switch to the input of the vibrator and simultaneously to the input of the memory unit. The output of the memory unit is connected to the vibrator input via the second contact of said switch.

The adjusted random signals of the first group and then of the second group are successively stored in the memory unit. Thereafter the signals in all bands of the predetermined frequency range are simultaneously read off and applied to the vibration-testing machine by the use of the switch.

The known method and device permit obtaining preset values of spectral vibration acceleration density in each band of a predetermined frequency range with due account taken of the amplitude-frequency response of the "vibrator-article" system. However, this may be done only at one point on a given article using one vibrator (and not at all check points having characteristic values of spectral vibration acceleration density in each band of a predetermined frequency range), which is generally a limiting factor, Also known in the art is a method of forming a random vibration spectrum (cf. Y. V. Beselov, V. V. Sumarokov and V. F. Cherepov "Equipment for Reproducing and Recording Random Signals and Shocks," Leningrad, izdatelstvo Leningradskogo doma naucho-technichesky propagandi, 1979, pp 15–18, in Russian) comprising the step of choosing check points on an article under test, said points having characteristic values of spectral vibration acceleration density in each band of a predetermined frequency range. Next, the article under test is subjected to vibration in the predetermined frequency range by the use of a multichannel random signal shaper wherein each channel furnishes a narrow-band random signal, the output signal level being appropriately adjusted. The operations performed at the check points include measurements of spectral vibration acceleration density in the specified bands, computation of mean values of spectral vibration acceleration density at all the check points separately in each band of the predetermined frequency range and subsequently comparison of the obtained mean values with preset values of spectral vibration acceleration density for a particular article, the next step being utilization of error signals to adjust levels of narrow-band random signals in each channel of the multichannel shaper, the random signal spectrum at the output of said shaper equal to the sum of the narrow-band random signals characterizing the random vibration spectrum of the article under test.

The foregoing method is accomplished by a device for forming a random vibration spectrum (cf. the cited publication) comprising a multichannel shaper having several channels, each of which includes such series-connected components as a white noise generator, a bandpass filter and an adjustable amplifier, the outputs of all the adjustable amplifiers being connected to the inputs of an adder which is also a part of the multichannel shaper. The output of the adder is connected to a power amplifier connected to the input of a vibrator mounting an article under test. The device also comprises vibration pick-ups representing means for converting mechanical oscillations into an electrical signal, said means being secured at check points on the article under test. The outputs of the vibration pick-ups are connected through a switch to the input of a multichannel random signal spectrum analyzer, each channel of which corresponding to a similar channel of the multichannel shaper includes a bandpass filter, a random signal level meter, and a comparison unit. The outputs of the analyzer are connected to the control inputs of the adjustable amplifiers in similar channels of the multichannel shaper.

Wide-band random signals derived from the outputs of the white noise generators and having a uniform spectral density level in a predetermined frequency range come to narrow-band filters which separate from the wide-band random signal spectrum only those spectral components which are within their transmission band, the chosen parameters of the formed spectrum being a governing factor. The output signals of the narrow-band filters are amplified in the adjustable amplifiers and added up. The output signal of the multichannel shaper is applied to the vibrator input through the power amplifier. Random signals characterizing vibration at check points on the article under test are successively fed to the inputs of the bandpass filters of the spectrum analyzer by means of the switch. The output signals of the random signal level meter in each channel of the analyzer characterizing the spectral vibration acceleration density level are averaged with respect to the chosen check points. Thus, the signal level at the output of each analyzing channel characterizes the mean spectral vibration acceleration density level at several check points in the frequency band of a given channel. Next, the output signal of the meter in each channel of the analyzer characterizing the mean spectral vibration acceleration density in the frequency band of the given channel comes to the first input of the comparison unit, the input thereof being fed with a fixed voltage whose level determines the desired spectral vibration acceleration density level in the specified frequency band. An error signal from the output of the comparison unit is used to control the gain of the adjustable amplifier in a similar channel of the multichannel shaper.

With the known method, spectral vibration acceleration density is measured at check points by causing the article under test to vibrate in response to a random signal, a disadvantage substantially complicating the analysis, particularly when a predetermined frequency range is wide. The analysis of a random signal is characterized by errors:

$$\epsilon_r^2 = \frac{2\pi}{\Delta\omega_i \cdot T_a} + \frac{\Delta\omega_i^4}{(2\pi)^4 \cdot 576} \left[ \frac{G''(\omega)}{G(\omega)} \right]^2$$

(cf. J. S. Bendat, A. G. Piersol, Measurement and Analysis of Random Data, John Wiley & Sons Inc., New York, London, Sidney).

Measurements of levels of a random signal in channels of a multichannel shaper with respect to spectral vibration acceleration density values obtained by averaging the values of spectral vibration acceleration density at check points on a given article under test do not permit having random vibrations of the article under test with predetermined values of spectral vibration acceleration density at each check point on the article under test. Stated differently, articles may not be subjected to random vibrations equivalent of actual vibrations affecting the articles in operation.

Disadvantages of the known device are, firstly, the need for a multichannel random signal analyzer, which substantially complicates the device and gives rise to a considerable error component thereof due to random nature of a measured signal and, secondly, stringent requirements for squareness, stability and similarity of amplitude-frequency responses of similar channels of a multichannel shaper and a random signal analyzer to enable normal operation of the device. If said requirements are not met, there occurs a control error, particularly when stability of a tuning frequency of a filter is comparable with its transmission band, a condition characterized by that the nth channel of the analyzer measures the random signal level in the (n−1)th or (n+1)th frequency band and controls the signal in the nth frequency band.

DISCLOSURE OF THE INVENTION

A primary object of the invention is to provide a method of forming a random vibration spectrum, which would permit causing vibration of an article under test with preset characteristic values of spectral vibration acceleration density at each check point thereon in each band of a predetermined frequency spectrum.

Another primary object of the invention is to create a device for forming a random vibration spectrum, which would permit obtaining desired characteristic values of spectral vibration acceleration density at each check point on the article under test by the use of one shaper and one vibrator.

Still another object of the invention is to provide a novel method which would allow substantially enhancing accuracy in forming a random vibration spectrum at each check point in each band of a predetermined frequency range.

A further object of the invention is to create a device for forming a random vibration spectrum which would make it possible to measure random vibration parameters at check points by the use of a conventional amplitude detector having a small integration constant and to eliminate the need for utilizing a multichannel random signal analyzer.

Still further object of the invention is to enable use of simple, commonly known structural components of the device which would be substantially simplified as a whole.

One more object of the invention is to provide a method which would make it possible to obviate a random character of vibration parameters.

Another object of the invention is to create a method of forming a random vibration spectrum, which would allow eliminating a control error occurring if no similarity exists in tuning bandpass filters of a multichannel random signal shaper and bandpass filters of a multichannel means for analyzing random vibrations of an article under test.

The foregoing objects are accomplished by that in a method of forming a random vibration spectrum comprising the steps of choosing check points on an article under test, said points being characterized by certain values of spectral vibration acceleration density in each band of a predetermined frequency range, causing vibration of the article in the predetermined frequency range by the use of a multichannel random signal shaper, each channel thereof having an intrinsic amplitude-frequency response and an adjustable random signal level, checking vibration parameters in each of said frequency bands, and subsequently using the obtained vibration data and said values of spectral vibration acceleration density to compute random signal levels in each channel of the multichannel shaper characterizing a random vibration spectrum, according to the invention, vibrations of the article in the predetermined frequency range are preliminarily set up by the use of harmonic variable frequency oscillations, characteristic values of spectral vibration acceleration density being set at each check point on the article under test in the specified frequency bands, an amplitude-frequency response of the "vibrator-article" system being chosen as a vibration parameter to be checked at said check points, the subsequent step being computation of random signal levels $k_n$ in each channel of the multichannel shaper, which is done by solving a set of linear equations of the form $$q_{li} = \sum_{n=1}^{N} a_{nli} \cdot K_n^2,$$

where $q_{li}$ is a preset value of spectral vibration acceleration density at the l-th check point in the i-th frequency band of the predetermined frequency range, coefficients $a_{nl}$ at the l-th check point in the i-th frequency band for the n-th channel of the multichannel shaper being computed from the formula:

$$a_{nli} = \frac{1}{\Delta\omega_i} \int_{\Delta\omega_i} \phi_n^2(\omega) \cdot \psi_l^2(\omega) \cdot d\omega,$$

where
- $\phi_n(\omega)$ is the amplitude-frequency response of the n-th channel of the multichannel shaper;
- $\psi_l(\omega)$ is the amplitude-frequency response of the "vibrator-article" system at the lth check point; and
- $\Delta\omega_i$ is the ith band of the predetermined frequency range;

the sum thereof being used to determine a random signal utilized to form the predetermined random vibration spectrum of the article under test.

The foregoing object is also accomplished by that a device for forming a random vibration spectrum comprising a multichannel shaper having several channels, each of which includes such series-connected components as a white noise generator, a bandpass filter and an adjustable amplifier, the outputs of all the adjustable amplifiers being connected to the inputs of an adder whose output is connected to the input of a power amplifier, the output of which is, in turn, connected to the input of a vibrator mounting the article under test, vibration pick-ups being mounted at check points on said article, said vibration pick-ups representing means for converting mechanical oscillations into an electrical signal, the outputs of said converting means being connected to the inputs of a switch connected to an analyzer, a unit for setting parameters of a formed spectrum, and a control unit having one input thereof connected to the control input of the switch, according to the invention, includes a variable-frequency harmonic oscillator whose output is connected to a gate inserted between the output of the adder and the input of the power amplifier and connected to the second output of the control unit, and a memory unit having its output connected to a computing unit whose second input is connected to the unit for setting parameters of a formed spectrum, while the third (control) input thereof is connected to the first output of the control unit connected to the control input of the harmonic variable-frequency oscillator and to the control input of the memory unit whose other input is connected to the output of the variable-frequency harmonic oscillator and to the output of the analyzer representing an amplitude detector, one output of the computing unit being connected to the input of the adjustable amplifier in each channel of the multichannel random signal shaper, while the other output thereof is connected to the third input of the memory unit.

The method and device for forming a random vibration spectrum according to the invention permit obtaining a desired vibration spectrum at several check points on an article under test using one vibrator.

BRIEF DESCRIPTION OF DRAWINGS

The invention will now be described further with reference to a specific embodiment thereof, taken in conjunction with the accompanying drawings, wherein.

BEST MODE OF CARRYING OUT THE INVENTION

The proposed method of forming a random vibration spectrum essentially consists in the following.

Check points are chosen on an article 1 (FIG. 1) under test, for example, two check points (a and b) determined as a result of analysis of vibration of the article 1 in operation and having different values ($q_{li}$) of spectral acceleration density in a frequency range also found during in-service analysis. If an article being designed is to be tested, the check points a and b may be chosen with due regard for specific conditions set by the designers. For example, the check points a and b may be attachment points and portions of the article 1 particularly sensitive to vibration.

Figure 1:
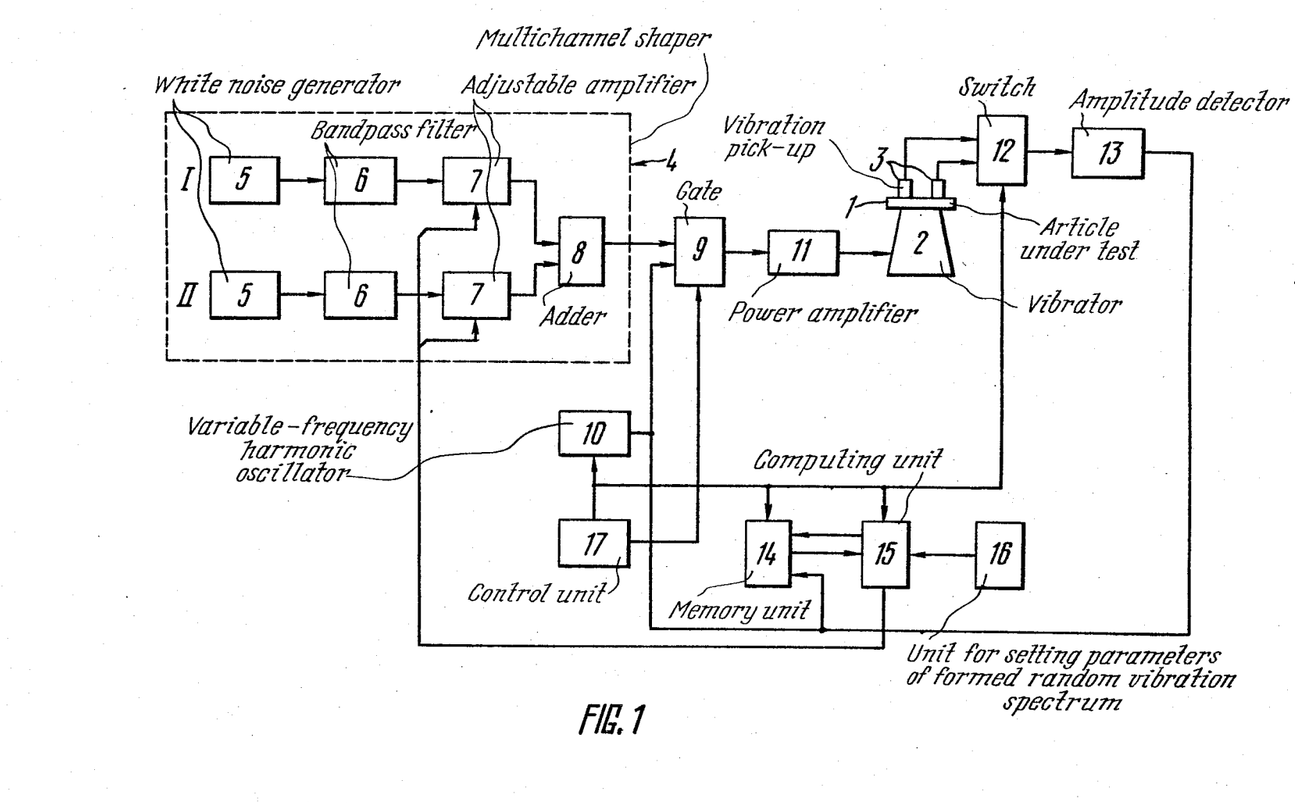
FIG. 1 is a block diagram of a device for forming a random vibration spectrum according to the invention.

Providing a characteristic value ($q_{li}$) of spectral vibration acceleration density at each check point (a and b) in each band of a predetermined frequency range allows performing laboratory tests of articles in conditions resembling to a greater extent actual operating conditions.

The article 1 to be tested is secured to a vibrator 2, for example, an electrodynamic or electrohydraulic vibrator. Vibration pick-ups 3 (means for converting mechanical oscillations into an electrical signal) are secured at the check points a and b on the article 1 under test. The number of the vibration pick-ups corresponds to the number of the check points. Vibration of the article 1 is caused by a multichannel shaper 4 wherein each channel has a characteristic amplitude-frequency response $\phi_n(\omega)$ and an adjustable random output signal level $k_n$ where n is the number of the channel. Narrow-band random signals of all channels form a sum signal used to cause vibration of the article 1 under test in a desired spectrum.

To determine the required random output signal level $k_n$ in each channel of the multichannel shaper 4, vibration of the article 1 under test is preliminarily caused by harmonic oscillations at a continuously variable frequency in a predetermined frequency range. The amplitude-frequency response $\psi_l(\omega)$ of the "vibrator-article"

system is successively measured at each l-th check point.

The use of the amplitude-frequency response $\psi_l(\omega)$ as a vibration parameter under check makes it possible to utilize harmonic analysis which is simplier and more accurate than a random signal analysis.

The next step is to solve a set of linear equations of the form $$q_{li} = \sum_{n=1}^{N} a_{nli} \cdot k_n^2, \quad (1)$$

where $q_{li}$ is a preset value of spectral vibration acceleration density at the lth check point in the ith band of the predetermined frequency range, the coefficients of the set of linear equations, $a_{nl}$, being determined from the formula $$a_{nli} = \frac{1}{\Delta\omega_i} \int_{\Delta\omega_i} \phi_n^2(\omega) \cdot \psi_l^2(\omega) \cdot d\omega \quad (2)$$

Computing the random output signal level $k_n$ in each channel of the multichannel shaper 4 permits obtaining characteristic values $q_{li}$ of spectral vibration acceleration density at each check point on the article under test in all bands of the predetermined frequency range.

The above equations are derived from the known relationships (cf. the cited publication):

$$G_l(\omega) = G_o(\omega)\psi_l^2(\omega)$$

$$q_{li} = \frac{1}{\Delta\omega_i} \int_{\Delta\omega_i} G_l(\omega) \cdot d\omega$$

where
- $G_o(\omega)$ is a signal spectrum at the input of the "vibrator-article" system, which is formed by the multichannel shaper;
- $G_l(\omega)$ is a spectrum at the output of the "vibrator-article" system, for example, at the lth check point;
- $q_{li}$ is spectral acceleration density, for example, at the lth check point in the ith frequency band.

For the multichannel spectrum the random output signal spectrum being an input spectrum for the "vibrator-article" system is as follows:

$$G_o(\omega) = N_o \cdot \sum_{n=1}^{N} k_n^2 \phi_n^2(\omega),$$

where
- $N_o$ is a random signal level of a noise source 5, which is constant in the predetermined frequency range (it may be taken to be unity); and
- $k_n$ is the gain of the nth channel of the shaper 4, which determines its random output signal level at $N_o = 1$ and $\phi_n(\omega)_{max} = 1$.

Hence, we get $$q_{li} = \frac{1}{\Delta\omega_i} \int_{\Delta\omega_i} \left[ \sum_{n=1}^{N} k_n^2 \phi_n^2(\omega) \right] \cdot \psi_l^2(\omega) \cdot d\omega =$$

$$\sum_{n=1}^{N} k_n^2 \frac{1}{\Delta\omega_i} \int_{\Delta\omega_i} \phi_n^2(\omega) \cdot \psi_l^2(\omega) \cdot d\omega = \sum_{n=1}^{N} k_n^2 a_{nli}.$$

The proposed method of forming a random vibration spectrum substantially increases accuracy in testing articles for random vibrations whereby testing conditions resemble to a greater extent actual operating conditions.

The method of forming a random vibration spectrum in compliance with the invention will now be illustrated by the following example in which values of an output signal level are computed in each channel of the multichannel random signal shaper 4.

Assume that the task is to form a random vibration spectrum for testing the blade of a gas-turbine engine. Relative values of spectral vibration acceleration density are set at two check points (a and b) on the blade under test in a relative frequency range, for example, from 0.2 to 2 covered in three bands: 0.2–0.8; 0.8–1.4; 1.4–2 — $q_{11} = 0.18$; $q_{12} = 0.41$; $q_{13} = 0.53$; $q_{21} = 0.46$; $q_{22} = 0.5$; $q_{23} = 0.34$.

In the predetermined relative frequency range random vibrations of the blade are caused by the multichannel shaper 4 having, for example, six channels.

Each channel has a characteristic amplitude-frequency response $\phi_n(\omega)$:

$$\rho_n^2(\omega) = \frac{1}{1 + (\omega - \omega_n)^2/0.04},$$

where $\omega_n = 0.3; 0.6; 0.9; 1.2; 1.5; 1.8$, and an adjustable output signal level $k_n$.

It is necessary to compute the values of $k_n$ which would ensure desired parameters of a vibration spectrum being formed.

The initial step is to cause vibration of the article 1 by the use of a harmonic signal at a continuously variable frequency in the relative frequency range from 0.2 to 2, the subsequent step being measurements of the amplitude-frequency response $\psi_l(\omega)$ at the two check points a and b on the blade.

Assume that the measurements yield $$\psi_1^2(\omega) = 0.1 + 0.4\omega$$

$$\psi_2^2(\omega) = 1 - 0.3\omega$$

The next step is to compute the coefficients $a_{nl}$:

$$a_{111} = \int_{\Delta\omega_1} \phi_1^2(\omega)\psi_1^2(\omega)d\omega =$$

$$\int_{0.2}^{0.8} \frac{0.1 + 0.4\omega}{1 + \frac{(\omega - 0.3)^2}{0.04}} d\omega = 0.145;$$

$$a_{211} = \int_{\Delta\omega_1} \phi_2^2(\omega)\psi_1^2(\omega)d\omega =$$

$$\int_{0.2}^{0.8} \frac{0.1 + 0.4\omega}{1 + \frac{(\omega - 0.6)^2}{0.04}} d\omega = 0.202;$$

$$a_{121} = \int_{\Delta\omega_1} \phi_1^2(\omega)\psi_2^2(\omega)d\omega =$$

$$\int_{0.2}^{0.8} \frac{1 - 0.3\omega}{1 + \frac{(\omega - 0.3)^2}{0.04}} d\omega = 0.484.$$

Similarly, referring to formula (2) we compute the other coefficients $a_{nl}$.

Then a set of the following equations will be solved:

$$0.145 k_1^2 + 0.202 k_2^2 + 0.096 k_3^2 + 0.03 k_4^2 + 0.014 k_5^2 + 0.008 k_6^2 = 0.18;$$
$$0.034 k_1^2 + 0.09 k_2^2 + 0.227 k_3^2 + 0.354 k_4^2 + 0.162 k_5^2 + 0.05 k_6^2 = 0.41;$$
$$0.016 k_1^2 + 0.026 k_2^2 + 0.05 k_3^2 + 0.133 k_4^2 + 0.409 k_5^2 + 0.505 k_6^2 = 0.53;$$
$$0.484 k_1^2 + 0.526 k_2^2 + 0.225 k_3^2 + 0.073 k_4^2 + 0.035 k_5^2 + 0.02 k_6^2 = 0.46;$$
$$0.046 k_1^2 + 0.126 k_2^2 + 0.385 k_3^2 + 0.413 k_4^2 + 0.176 k_5^2 + 0.05 k_6^2 = 0.5;$$
$$0.01 k_1^2 + 0.017 k_2^2 + 0.034 k_3^2 + 0.094 k_4^2 + 0.286 k_5^2 + 0.3 k_6^2 = 0.34$$

Solving the above set of equations yields the values of the output signal level in each channel of the multichannel random signal shaper 4:

$K_1^2 = 0.005;$ $K_2^2 = 0.65;$ $K_3^2 = 0.21;$ $K_4^2 = 0.6;$ $K_5^2 = 0.33;$ $K_6^2 = 0.57$

At the output of the multichannel random signal shaper 4 we shall have the spectrum $$G_0(\omega) = \sum_{n=1}^{6} K_n^2 \cdot \phi_n^2(\omega),$$

which ensures desired values of $q_{1i}$ of spectral vibration acceleration density in each check point (a, b) in each of the three bands of the predetermined frequency range.

Turning now to FIG. 1 the device for forming a random vibration spectrum according to the invention comprises such series-connected components as a white noise generator 5, a bandpass filter 6 and an adjustable amplifier 7 in each channel of the multichannel shaper 4. To enable better understanding of the design of the proposed device for forming a random vibration spectrum, the block diagram of FIG. 1 shows the multichannel shaper 4 with only two channels I and II. The outputs of all the adjustable amplifiers 7 are connected to the inputs of an adder 8 having its output connected to one of the inputs of a gate 9 whose other input is connected to a variable-frequency harmonic oscillator 10. The output of the gate 9 is connected to a power amplifier 11 which is connected to the input of a vibrator 2 mounting the article 1 under test, vibration pick-ups 3 being secured at check points a and b on said article. The outputs of all the vibration pick-ups 3 are connected through a switch 12 to an amplitude detector 13 whose output is connected to one of the inputs of a memory unit 14. Connected to the same input is the variable-frequency harmonic oscillator 10. The output of the memory unit 14 is connected to one of the inputs of a computing unit 15 whose other input is connected to a unit 16 for setting parameters of a formed random vibrating spectrum. Connected to the third (control) input of the computer unit 15 is the first output of a control unit 17, the same output of the control unit 17 being connected to the control inputs of the variable-frequency harmonic oscillator 10, the memory unit 14 and the switch 12. The second output of the control unit 17 is connected to the control input of the gate 9. One of the outputs of the computing unit 15 is connected to the inputs of the adjustable amplifiers 7 in all the channels, while the other output thereof is connected to the third input of the memory unit 14.

The device for forming a random vibration spectrum according to the invention operates as follows.

A control signal from the control unit 17 transfers the device into a "tuning" mode. In this case the output of the variable-frequency harmonic oscillator 10 is connected to the input of the power amplifier 11 through the gate 9. Simultaneously a control signal from the output of the control unit 17 triggers the variable-frequency harmonic oscillator 10, its output signal being applied through the power amplifier to the input of the vibrator 2, thus causing harmonic oscillations of the article 1 under test, and to the control input of the switch 12 which alternately connects the vibration pickups 3 to the input of the amplitude detector 13. The output signals of the amplitude detector 13 are the measured values of the amplitude-frequency responses $\psi_i(\omega)$ of the "vibrator-article" system at the check points a and b on the article 1 under test, which are stored in the memory unit 14 in conjunction with the current frequency of the variable-frequency harmonic oscillator 10. The memory 14 also stores the amplitude-frequency responses $\phi_n(\omega)$ of the bandpass filters 6 of the multichannel shaper 4.

Before measurements in the "tuning" mode, the signal from the first output of the control unit 17 is fed to the control inputs of the memory unit 14 and the computing unit 15 to set them to the initial state.

On completion of measurements of the amplitude-frequency responses $\psi_i(\omega)$ at each check point a, b, the output signal of the memory unit 14 comes to the input of the computing unit 15. The computing unit 15 successively computes the coefficients $a_{nli}$ using formula (2) and the obtained values are stored in the memory unit 14. After the coefficients $a_{n1}$ are computed, all values of $a_{n1}$ are supplied to the input of the computing unit 15. Simultaneously the other input of the computing unit 15 accepts the output signal of the unit 16 for setting parameters of a formed random vibration spectrum in the form of $q_{1i}$.

Thereafter the computing unit 15 solves the set of linear equations (1) and computes the gain $k_n$ of the adjustable amplifiers 7. The computation over, the control unit 17 disconnects the variable-frequency harmonic oscillator 10 from the input of the power amplifier 11 and connects thereto the output of the multichannel shaper 4, thereby transferring the device to the "testing" mode.

In the "testing" mode wide-band random signals having uniform spectral power density in a predetermined frequency range are applied from the outputs of the white noise generators 5 to the inputs of the bandpass filters 6 which pass to their output only those components of the wide-band random signal which are within the transmission band thereof. The output signals of the bandpass filters 6 come to the inputs of the adjustable amplifiers 7 whose gain has been set using the computed and fixed values of $k_n$. The random output signals of channels I and II of the multichannel shaper 4 are fed to the inputs of the adder 8 whose output signal is applied through the gate 9 and the power amplifier 11 to the input of the vibrator 2, thus causing random vibration of the article 1 in a desired vibration spectrum.

The use of the variable-frequency harmonic oscillator 10 in the proposed device has made it possible to measure amplitude-frequency responses $\psi_j(\omega)$ of the "vibrator-article" system at check points by the use of a conventional amplitude detector 13 having a small integration constant, an advantage eliminating the need for such an intricate unit as a multichannel random signal analyzer. Thus, no stringent requirements are placed for squareness and similarity of amplitude-frequency responses $\phi_n(\omega)$ of bandpass filters in shaper channels and of bandpass filters in similar channels of an analyzer, which generally eliminates a control error. So, the device forming the subject of the invention permits both obtaining characteristic values $q_{1i}$ of spectral vibration acceleration density at each check point on an article under test using one vibrator and solving more accurately the problem of forming a random vibration spectrum at one check point in bands of a predetermined frequency range.

Figure 2:
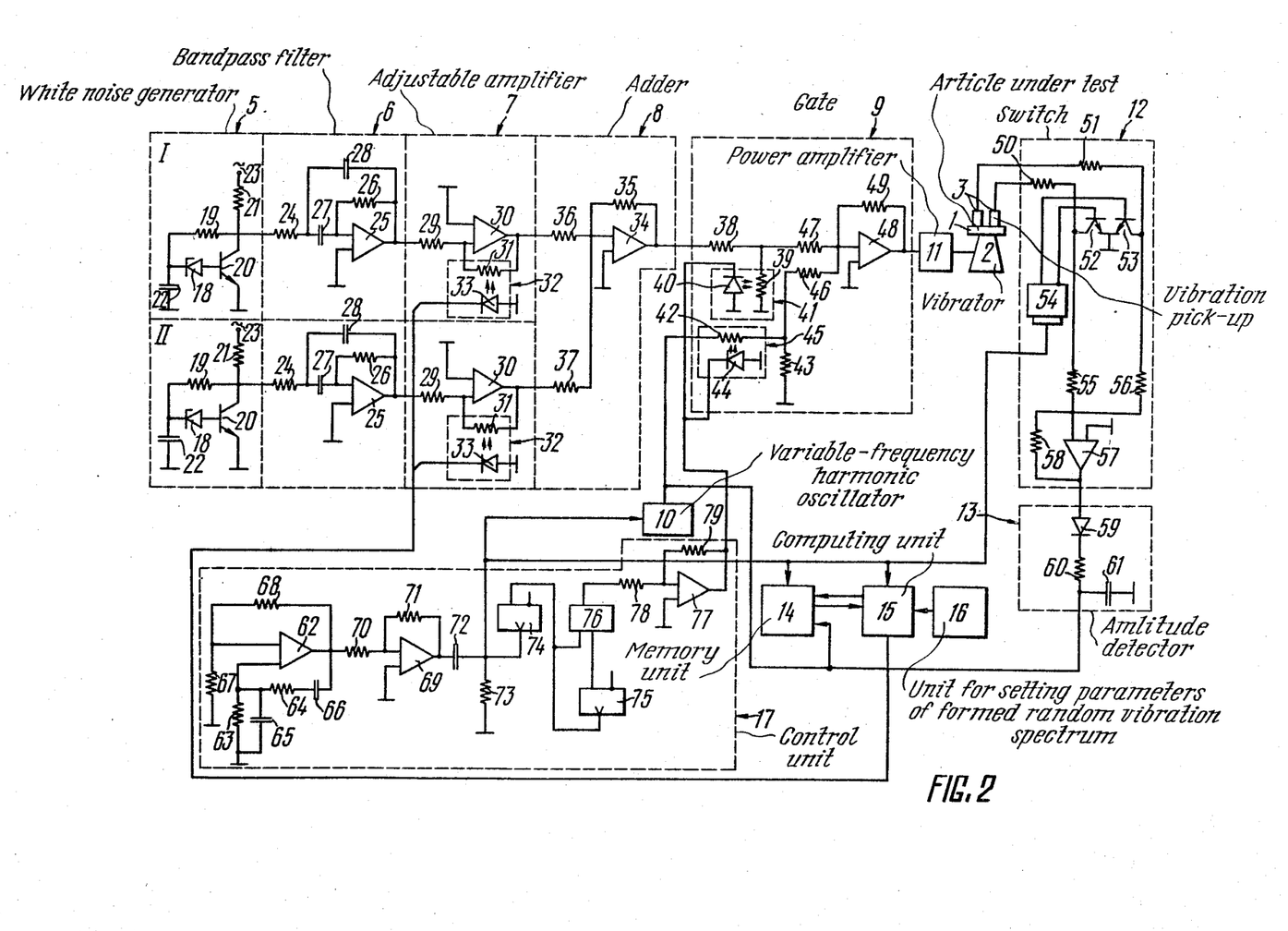
FIG. 2 is a functional diagram of the device of FIG. 2 according to the invention.

A functional diagram of the proposed device for forming a random vibration spectrum is shown in FIG. 2. Referring to the drawing in the device comprises the multichannel shaper 4 wherein each channel includes the white noise generator 5, in which a primary noise source is a stabilizer diode 18 which operates as an avalanche breakdown element. The avalanche breakdown mode is set by a resistor 19 inserted between the cathode of the stabilizer diode 18 and the collector of a transistor 20 which forms an amplifier in conjunction with a resistor 21. A capacitor 22 defines the lower frequency in a generated noise spectrum. The amplifier built around the transistor 20 is fed over a power line 23. The collector of the transistor 20 is connected to the input of the bandpass filter 6, more specifically, to an input resistor 24. The narrow-band filter 6 uses an operational amplifier 25. The resistors 24, 26 and capacitors 27, 28 define the tuning frequency of the bandpass filter 6. The output of the operational amplifier 25 is connected through a resistor 29 to the adjustable amplifier 7 employing an operational amplifier 30. A photoresistor 31 placed in the feedback circuit defines gain $K_n$ of the adjustable amplifier 7. The photoresistor 31 forms in conjunction with a light-emitting diode 32 a photon-coupled pair 33 contained in a single enclosure. The output of the adjustable amplifier 7 is connected to one of the inputs of the adder 8. The adder 8 uses an operational amplifier 34 with a resistor 35 placed in its feedback circuit. Resistors 36 and 37 act as input resistors of the adder 8. The output of the operational amplifier 33 is connected to the first input of the gate 9, more specifically, to such series-connected components as resistors 38 and a photoresistor 39 which jointly form a controllable voltage divider. The photoresistor 39 forms in conjunction with a light-emitting diode 40 a photon-coupled pair 41. The harmonic oscillator 10, for example, Brüel & Kjaer Model 1023 (cf. brief cataloque "Instruments for sound and vibration analysis and data processing," 1978, RU-28), is connected to the second input of the gate 9, more specifically to a photoresistor 42 which also forms, in conjunction with a resistor 43, a controllable voltage divider due to changing light emission of a LED 44 which forms a photo-coupled pair 45 in conjunction with the photoresistor 42. The outputs of both controllable voltage dividers are connected through resistors 46 and 47 to an operational amplifier 48 which forms, in conjunction with a resistor 49, an adder in the feedback circuit, the output of said adder serving as the outputs of the gate 9 and being connected to the input of the power amplifier 11 which is widely known in the art and is described, for example, "Instruments and systems for measuring vibration, noise and shock", Handbook in two parts, Part 2, Moscow, Mashinostroenye publishers, 1978, p 317, in Russian. Also, it may represent a Model 2706 power amplifier manufactured by the same company (cf. brief catalogue "Instruments for sound and vibration analysis and data processing," 1973, RS-22). The output of the power amplifier 11 is connected to the input of the vibrator 2 which is chosen to suit the article 1 under test. The vibration pick-ups 3 to be mounted at the check points a and b on the article 1 under test are also widely used during vibration tests. They are normally included into the standard equipment of the vibrator 2. The outputs of the vibration pickups 3 are connected to the inputs of the switch 12, more specifically, to input resistors 50 and 51. Transistors 52 and 53 are switching elements controlled by a flip-flop 54. The collectors of the transistors 52 are connected, respectively, to resistors 55 and 56. An operational amplifier 57 forms an adder in conjunction with a resistor 58. The output of the operational amplifier 57 serves as the output of the switch 12, while the complementing input of the flip-flop 54 acts as the control input of the switch 12. The output of the switch 12 is connected to a diode 59 which forms the amplitude detector 13 in conjunction with an integrating network made up of a resistor 60 and a capacitor 61. The output of the amplitude detector 13 is connected to the analog input of the memory unit 14 which may represent, for example, Brüel & Kjaer Model 7502 manufactured in Denmark (cf. brief catalogue "Instruments for sound and vibration analysis and data processing", 1973, RS-22). The digital output of the memory unit 14 is connected to the data input of the computing unit 15 which may use integrated circuits (cf. "Analog and digital integrated circuits" edited by S. V. Yakubovsky, Moscow, Soviet Radio publishers, 1979, pp. 153–159, in Russian) or, for example, a Model 7504 computer manufactured by the same company. Connected to the other data input of the computing unit 15 is the unit 16 for setting parameters of a formed random vibration spectrum, which may represent, for example, a Consul numeric input printer (cf. "Instruments and systems for measuring vibration, noise and shock", Handbook edited by V. V. Kluchev, two parts, Part 1, Moscow, Mashinostroenye publishers, 1978, p 351, in Russian) or a Model 6401 teleprinter manufactured by the same company. The first output of the computing unit 15 is connected to the digital input of the memory unit 14, while the second output of the computing unit 15 is connected to the light-emitting diodes 32. The memory unit 14 is also connected to the output of the harmonic oscillator 10.

A synchronization period in operation of the variable-frequency harmonic oscillator 10, the memory unit 14, the computing unit 15 and the switch 12 is conditioned by natural frequency of a sine-wave oscillator built around an operational amplifier 62. The oscillation frequency is dependent upon the values of resistors 63, 64, and capacitors 65, 66. Resistors 67 and 68 define the level of a sine-wave signal at the output of the operational amplifier 62 which is connected to the input of an amplifier-limiter built around an operational amplifier 69. Resistors 70 and 71 determine the gain of the amplifier-limiter. The output of an operational amplifier 69 is connected to a differentiating network incorporating a capacitor 72 and a resistor 73. Series-connected T-flip-flops 74, 75 and an AND gate 76 form a counter whose output is connected to the input of an amplifier using an operational amplifier 77 and resistors 78, 79. The output of the flip-flop 74 is also connected to the second input of the gate 76. The output of the differentiating network serving as the first synchronizing output of the control unit 17 is connected to the control inputs of the variable-frequency harmonic oscillator 10, the memory unit 14, the computing unit 15, and the switch 12. The output of the operational amplifier 77 serving as the second output of the control unit 17 is connected to the light-emitting diodes 40 and 44 of the gate 9.

The proposed device for forming a random vibration spectrum operates in the following manner.

In the "tuning" mode the output signal of the variable-frequency harmonic oscillator 10 over a predetermined frequency range is applied to the input of the gate 9, more specifically, to the photoresistor 42.

The harmonic oscillator of the control unit 17 using the operational amplifier 62 is an oscillator connected as a Wien bridge, its oscillation frequency being determined by the resistances of the resistors 63, 64 and the capacitances of the capacitors 65, 66. The resistors 67 and 68 define the level of an output signal which is subsequently applied to the input of the amplifier-limiter using the operational amplifier 69. From the output of the operational amplifier 69 the amplified oscillations limited in amplitude are fed to the differentiating network made up of the capacitor 72 and the resistor 73.

The pulse signals from the resistor 73 are fed to the control inputs of the variable-frequency harmonic oscillator 10, the switch 12, the memory unit 14 and the computing unit 15, which are, thus, synchronized. Also, said signal comes to the complementing input of the flip-flop 74. Upon arrival of the first pulse corresponding to the start of measurements of the amplitude-frequency response of the "vibrator-article" system at the check point a on the article under test, a high potential will be present at the output of the flip-flop 74, while the output of the flip-flop 75 will still be at a low potential. The output of the AND gate will also be at a low potential which is applied through the resistor 78 to the inverting input of the operational amplifier 77. The output of the operational amplifier will be at a high negative potential whereby the light-emitting diodes 40 and 44 will glow, a condition characterizing the "tuning" mode. The values of the photoresistors 39 and 42 are appreciably smaller than the resistances of the resistors 38 and 43. Therefore, the input of the operational amplifier 48 of the gate 9 accepts the output signal of the harmonic oscillator 10 whose harmonic frequency changes with respect to the lower frequency of the predetermined frequency range.

As the second pulse comes to the complementing input of the flip-flop 74, which marks the start of measurements of the amplitude-frequency response $\psi_f(\omega)$ of the "vibrator-article" system at the second check point b, a low potential will be present at the output of the flip-flop 74, and the output of the flip-flop 75 will be at a high potential. The output of the AND gate 76 will still be at a low potential. Therefore, upon arrival of the second pulse, the gate 9 will have at its output the signal from the harmonic oscillator 10, its frequency being again changed with respect to the lower frequency of the predetermined frequency range.

Thus, in the "tuning" mode the output of the gate 9, more specifically, the output of the operational amplifier 48 will receive the signal from the variable-frequency harmonic oscillator 10, which is applied through the power amplifier 11 to the input of the vibrator 12, thereby causing harmonic vibrations of the article 1 mounting at its check points a and b the vibration pick-ups 3 which convert mechanical oscillations of the article 1 into an electrical signal. The output signal of the first vibration pick-up 3 secured at the check point a comes to the resistor 50 connected into the collector of the transistor 52. The transistor 52 is controlled by applying a signal of an appropriate (low or high) level to its base, said signal coming from the output of the flip-flop 54. As a low-level signal comes to the base of the transistor 52, it is turned off and its collector signal is delivered to the resistor 55. From the output of the operational amplifier 57 the signal of the first vibration pick-up 3 comes to the input of the analyzer 13. The base of the transistor 53 receives a high-level signal from the other output of the flip-flop 54. Therefore, the transistor 53 is turned on, and no signal is present at its collector. As the second pulse comes to the input of the flip-flop 54, it changes state and its first output develops a high-level signal. As a result, the transistor 52 is turned on, and no signal is present at its collector. The input of the analyzer 13 receives the signal from the second vibration pick-up 3.

A variable-frequency signal is applied from the output of the switch 12 to the anode of the diode 59. From the cathode of the diode 59 the rectified signal comes to the integrating network made up of the resistor 60 and the capacitor 61. From the output of the analyzer 13 a signal in the form of d-c voltage proportional to the amplitude-frequency response of the "vibrator-article" at the check point a $\psi_a(\omega)$ and then at the check point b $\psi_b(\omega)$ comes to the analog input to the memory unit 14, which also accepts the values of the current frequency $\omega$ of the variable-frequency harmonic oscillator 10. The memory unit 14 also stores the amplitude-frequency characteristics $\phi_n(\omega)$ of the bandpass filters 6 of the multichannel shaper 4.

Before measurements in the "tuning" mode, the signal derived from the first output of the control unit 17 is applied to the control inputs of the memory unit 14 and the computing unit 15, thus setting them to the initial state. On completion of measurements of the amplitude-frequency responses $\psi_f(\omega)$ at each check point a,b, the output signal of the memory unit 14 comes to the input of the computing unit 15. In the computing unit 15 coefficients $a_{n1}$ are successively computed from formula (2) and stored in the memory unit 14.

After the coefficients $a_{n1}$ have been computed, all values of $a_{n1}$ are supplied to the computing unit 15. Simultaneously the other input of the computing unit 15 receives the output signal of the unit 16 for setting parameters of a formed random vibration spectrum in the form of values $q_{1i}$. Then the computing unit 15 solves a set of linear equations (1) and computes the gain $K_n$ of the adjustable amplifiers 7.

As the third pulse comes to the complementary input of the flip-flop 74, which corresponds to the end of measurements of the amplitude-frequency responses $\psi_f(\omega)$ of the "vibrator-article" system, the output of the flip-flop 74 will be at a high potential. The two inputs of the AND gate 76 receive high-level signals, which results in a high-level signal being developed across its output. The output signal of the AND gate 76 is fed through the resistor 78 to the inverting input of the operational amplifier 77. The output of the operational amplifier 77 will be at a low potential, and the light-emitting diodes 40, 44 will no longer glow, which indicates that the device is transferred to the "testing" mode.

In the "testing" mode a wide-band random signal is applied from the output of the noise generator 5 in channels I and II of the random signal shaper 4, more specifically, from the collector of the transistor 20, to the input resistor 24 of the bandpass filter 6 which separates from the entire input signal spectrum only those spectral components that are within its transmission band. The midband frequency in the transmission band is dependent upon the values of the resistors 24, 26 and the capacitors 27, 28. Also, the transmission band depends on the gain of the operational amplifier 25. From the output of the operational amplifier 25 a narrow-band random signal is fed to the input of the adjustable amplifier 7, more specifically, through the input resistor 29 to the input of the operational amplifier 30 whose gain is conditioned by the resistance of the photoresistor 31, which, in turn, depends on the glow of the light-emitting diode 32. The LED 32 is fed with voltage taken from the output of the computing unit 15 and proportional to the value of $K_n$ computed in the "tuning" mode. The output signals of the operational amplifiers 30 in channels I and II come to the adder 8, that is, to the input of the operational amplifier 34 through the input resistors 36 and 37, respectively. From the output of the operational amplifier 34 the obtained wide-band random signal corresponding to a predetermined random vibration spectrum of the article under test at the check points a and b comes to the first input of the gate 9, more specifically, to the resistor 38. In the "testing" mode a low-level signal derived from the second output of the control unit 17, more specifically, from the output of the operational amplifier 77 comes to the light-emitting diodes 40 and 44. The resistance of the photoresistors 39 and 42 will be appreciably greater than the resistance of the resistors 38 and 43. The output signal of the variable-frequency harmonic oscillator 10 is not fed to the resistor 46, and the obtained wide-band random signal is applied from the output of the operational amplifier 34 via the resistors 38, 47, the operational amplifier 48 and the power amplifier 11 to the input of the vibrator 2, thereby causing vibrations of the tested article 1 with preset values of spectral density of random vibration acceleration at the check points a and b.

The proposed functional arrangement of the device for forming a random vibration spectrum permits use of simple, widely known standard elements and finished stock-produced units. Another advantage of the proposed circuit configuration is utilization of a small-size specialized computer, a trend holding much promise in the computer field. Furthermore, the device is made fully automatic, a feature enabling employment of unqualified personnel in testing various articles.

The method of forming a random vibration spectrum in compliance with the invention and the device therefor allow more accurate formation of a desired random vibration spectrum at each check point on an article under test over the entire frequency range, a feature making laboratory random vibration testing conditions resemble more closely actual operating conditions.

What is claimed is:

1. A method of forming a random vibration spectrum of an article under test in a "vibrator-article" system by the use of a multichannel random signal shaper wherein each channel has a characteristic amplitude-frequency response and an adjustable random output signal level comprising the steps of:

setting a vibration frequency range in which said article is to be tested;

dividing said frequency range into bands, each of which is characterized by a preset spectral density of vibration acceleration;

choosing check points on said article, which are characterized by different values of spectral vibration acceleration density in each band of the predetermined frequency range;

causing vibration of said article under test by the use of harmonic variable-frequency oscillations;

measuring amplitude-frequency responses of the "vibrator-article" system at each check point on said article under test;

solving a set of linear equations of the form $$q_{li} = \sum_{n=1}^{N} a_{nli} \cdot K_n^2,$$

where $q_{li}$ is a preset value of spectral vibration acceleration density at the l-th check point in the i-th frequency band of the predetermined range, and $a_{nl}$ is the coefficient in said set of linear equations at the lth check point in the n-th channel of the mutichannel random signal shaper computed from the formula $$a_{nli} = \frac{1}{\Delta\omega_i} \int_{\Delta\omega_i} \phi_n^2(\omega)\psi_l^2(\omega)d\omega,$$

where $\phi_n(\omega)$ is said amplitude-frequency response of the n-th channel of said multichannel random signal shaper;

$\psi_l(\omega)$ is said measured amplitude-frequency response of said "vibrator-article" system at the lth check point on the article under test;

$\Delta\omega_i$ is the ith band of the predetermined frequency range;

$K_n$ is said level of an output random signal in the nth channel of said multichannel random signal shaper; and causing vibration of said article in said predetermined frequency range by the use of an output random signal of said multichannel shaper with the level $K_n$ of the random output signal in each channel of said multichannel shaper.

2. A device for forming a random vibration spectrum at check points on an article under test comprising:

a multichannel random signal shaper having several channels, each channel thereof including:

a white noise generator;

a bandpass filter connected to said white noise generator;

an adjustable amplifier having two inputs and an output, the first input being connected to said bandpass filter;

an adder having several inputs whose number corresponds to the number of said channels and an output, said inputs of said adder being connected to the outputs of said adjustable amplifiers of the respective channels;

a gate having three inputs and an output, the first input being connected to the output of said adder;

a power amplifier connected to the output of said gate;

a vibrator mounting said article under test and connected to the output of said power amplifier;

vibration pick-ups mounted on said article under test at said check points;

a switch having several inputs whose number corresponds to the number of said vibration pick-ups connected to the respective vibration pick-ups, a control input, and an output;

an amplitude detector connected to said output of said switch;

a unit for setting parameters of spectral vibration acceleration density in each band of the predetermined frequency range at each check point on said article under test;

a computing unit having three inputs and two outputs, the first input being connected to said setting unit, while the first output is connected to the second input of said adjustable amplifier in each channel;

a memory unit having three inputs and an output connected to the second input of said computing unit, the first input being connected to the second output of said computing unit, while the second input is connected to the output of said amplitude detector;

a control unit having two outputs, the first output being connected to said control input of said switch, to the third input of said memory unit and to the third input of said computing unit, while the second output is connected to the third input of said gate;

a variable-frequency harmonic oscillator having its input connected to the first output of said control unit and the output thereof connected to the third input of said gate and to the second input of said memory unit.

3. A device for forming a random vibration spectrum at check points on an article under test comprising:
(a) a power supply;
(b) a multichannel random signal shaper having several channels, each channel including:
a white noise generator composed of:
a capacitor having one grounded lead;
a stabilizer diode having its cathode connected to the second output of said capacitor;
a transistor whose base is connected to the anode of said stabilizer diode, the emitter of said transistor being suitably grounded;
a first resistor inserted between the cathode of said stabilizer diode and the collector of said transistor;
a second resistor, one lead of which is connected to the collector of said transistor, while its second lead is connected to said power supply;
a bandpass filter composed of:
a first resistor having one lead connected to the collector of said transistor;
a first capacitor having one lead connected to a second lead of said first resistor;
a second capacitor having one lead connected to said second lead of said first resistor;
a second resistor inserted between a second lead of said first capacitor and a second lead of said second capacitor;
an operational amplifier having inverting and noninverting inputs, the inverting input being suitably grounded, while its noninverting input is connected to said second lead of said first capacitor;

an adjustable amplifier composed of:
a resistor connected to the output of said first operational amplifier;
another operational amplifier which also has inverting and noninverting inputs, the inverting input being suitably grounded while the noninverting input is connected to said resistor;
a photoresistor inserted between the noninverting input of said other operational amplifier and its output;
a light-emitting diode lighting said photoresistor and forming therewith a photon-coupled pair, one lead of the LED being appropriately grounded;
(c) an adder incorporating:
several input resistors whose number corresponds to the number of said channels, first leads of said input resistors being connected to the outputs of said operational amplifiers comprised in each adjustable amplifier, second leads of said input resistors being suitably interconnected;
an operational amplifier having inverting and noninverting inputs, the inverting input being appropriately grounded, while the noninverting input is connected to said second leads of said input resistors;
a resistor inserted between said noninverting input of said operational amplifier and its output;
(d) a gate having three inputs and an output incorporating:
a first resistor having one lead connected to the output of said operational amplifier of said adder;
a first photoresistor having one grounded lead and another lead connected to said first resistor;
a first light-emitting diode lighting said first photoresistor and forming therewith a photon-coupled pair, one lead of said LED being suitably grounded;
a second resistor having one lead connected to a second lead of said first resistor;
a third resistor having one lead connected to a second lead of said second resistor;
an operational amplifier having inverting and noninverting inputs, the inverting input being suitably grounded, while the noninverting input is connected to said second lead of said second resistor;
a fourth resistor inserted between the noninverting input of said operational amplifier and its output;
a fifth resistor having one grounded lead and a second lead connected to a second lead of said third resistor;
a second photoresistor having one lead connected to said second lead of said fifth resistor;
a second light-emitting diode lighting said second photoresistor and forming therewith a photon-coupled pair, one lead of said LED being suitably grounded;
(e) a power amplifier connected to the output of said operational amplifier comprised in said gate;
(f) a vibrator mounting said article under test and connected to said power amplifier;
(g) several vibration pick-ups mounted on said article under test at said check points;
(h) a switch comprising:

several input resistors whose number corresponds to the number of said vibration pick-ups, first leads of said resistors being connected to the respective vibration pick-ups;

several transistors whose number corresponds to the number of said vibration pick-ups, emitters of all the transistors being grounded, while the collector of each transistor is connected to the second lead of the respective input resistor;

a polyphase flip-flop having several outputs corresponding to stable states, the number of said outputs corresponding to the number of said vibration pick-ups, each output being connected to the base of the respective transistor;

several output resistors whose number corresponds to the number of said vibration pick-ups, a first lead of each resistor being connected to the collector of the respective transistor;

an operational amplifier having inverting and noninverting inputs, the inverting input being suitably grounded, while the noninverting input is connected to all the second leads of said output resistors;

a resistor inserted between the noninverting input and the output of said operational amplifier;

(i) an amplitude detector having a diode whose anode is connected to said output of said operational amplifier of said switch;

a resistor having one lead connected to the cathode of said diode;

a capacitor, one lead of which is grounded, while a second lead thereof is connected to the second lead of said resistor;

(j) a unit for setting parameters of spectral vibration acceleration density in each band of the predetermined frequency range at each check point on said article under test;

(k) a computing unit having three inputs and two outputs, the first input being connected to said setting unit, while the first output is connected to a second lead of said light-emitting diode comprised in each adjustable amplifier;

(l) a memory unit having three inputs and an output connected to the second input of said computing unit, the first input thereof being connected to the second output of said computing unit, its second input being connected to the second lead of said resistor comprised in said amplitude detector;

(m) a control unit comprising:
a generator including:
a first resistor having one grounded lead;
a second resistor having one grounded lead;
an operational amplifier having inverting and noninverting inputs, the inverting input being connected to a second lead of said second resistor, while the noninverting input is connected to a second lead of said first resistor;

a third resistor inserted between the noninverting input and the output of said operational amplifier;

a first capacitor, one lead of which is grounded, while a second lead thereof is connected to said second lead of said second resistor;

a fourth resistor having one lead connected to said second lead of said first capacitor;

a second capacitor, one lead of which is connected to a second lead of said fourth resistor, while a second lead thereof is connected to said output of said operational amplifier;

an amplifier-limiter having:
a first resistor having one lead connected to said output of said operational amplifier comprised in said generator;

an operational amplifier having inverting and noninverting inputs, the inverting input being suitably grounded, while the noninverting input is connected to a second lead of said first resistor;

a second resistor inserted between said noninverting input and said output of said operational amplifier;

a differentiating network made up of:
a capacitor having one lead connected to said output of said operational amplifier of said amplifier-limiter;

a resistor having one grounded lead and a second lead connected to a second lead of said capacitor, to the third input of said memory unit, to the third input of said computing unit and to the input of the polyphase flip-flop;

a counter counting up to (L+1) where L is the number of said vibration pick-ups, the input of said counter being connected to said second lead of said capacitor comprised in said differentiating network;

a control signal amplifier comprising:
a first resistor having one lead connected to the output of said counter;

an operational amplifier having inverting and noninverting inputs, the noninverting input being suitably grounded, while said inverting input is connected to a second lead of said first resistor, the output of said operational amplifier being connected to the second lead of said first LED comprised in said gate and to the second lead of said second LED included in said gate;

a second resistor inserted between the inverting input and the output of said operational amplifier;

(n) a variable-frequency harmonic oscillator having its input connected to said second lead of said resistor comprised in said differentiating network, while its output is connected to said input of said memory unit and to the second lead of said second photoresistor included in said gate.

* * * * *